US006396803B2

(12) United States Patent
Hornsby et al.

(10) Patent No.: US 6,396,803 B2
(45) Date of Patent: May 28, 2002

(54) MODULATION METHODS AND STRUCTURES FOR WIRELESS COMMUNICATION SYSTEMS AND TRANSCEIVERS

(75) Inventors: James J. Hornsby, Newbury Park; Kris Kelkar, Camarillo, both of CA (US)

(73) Assignee: California Amplifier, Inc., Camarillo, CA (US)

( * ) Notice: Subject to any disclaimer, the term of this patent is extended or adjusted under 35 U.S.C. 154(b) by 0 days.

(21) Appl. No.: 09/817,657

(22) Filed: Mar. 26, 2001

Related U.S. Application Data
(60) Provisional application No. 60/214,894, filed on Jun. 29, 2000.

(51) Int. Cl.[7] ............................................... H04J 11/00
(52) U.S. Cl. ........................ 370/208; 370/343; 370/482
(58) Field of Search ................................. 370/208, 210, 370/343, 482, 485, 486

(56) References Cited

U.S. PATENT DOCUMENTS

| | | | | |
|---|---|---|---|---|
| 5,282,222 A | * | 1/1994 | Fattouche et al. | 375/219 |
| 5,379,289 A | | 1/1995 | DeSouza et al. | 370/85.13 |
| 5,485,456 A | | 1/1996 | Shtayer et al. | 370/60 |
| 5,524,023 A | | 6/1996 | Tsujimoto | 375/232 |
| 5,548,582 A | * | 8/1996 | Brajal et al. | 370/206 |
| 5,613,191 A | * | 3/1997 | Hylton et al. | 370/342 |
| 5,933,421 A | * | 8/1999 | Alamouti et al. | 370/203 |
| 5,953,311 A | | 9/1999 | Davies et al. | 370/210 |
| 5,973,642 A | | 10/1999 | Li et al. | 342/378 |
| 6,011,799 A | | 1/2000 | Kerstein et al. | 370/422 |
| 6,088,398 A | | 7/2000 | Wahlqvist et al. | 375/260 |
| 6,091,932 A | * | 7/2000 | Langlais | 725/111 |

* cited by examiner

*Primary Examiner*—Melvin Marcelo
(74) *Attorney, Agent, or Firm*—Koppel, Jacobs, Patrick & Heybl

(57) ABSTRACT

Wireless communication methods and structures are provided that enhance communication robustness while reducing cost. They communicate downstream data with orthogonal frequency division multiplexing (OFDM) transmission processes and upstream data with single carrier transmission processes. This combination of transmission processes is configured with various signal modulations (e.g., quadrature phase shift keying (QPSK), m-ary phase shift keying (MPSK) and n-quadrature amplitude modulation (QAM)) to provide lower cost upstream communication from customer services equipments (CPEs) and more robust downstream communication from headends than has been achieved in conventional communication systems. Signal diversity is enhanced by receiving communication signals with multiple antennas that are spatially separated and have different polarizations to thereby enhance frequency diversity. Signal diversity is further enhanced by combining the received signals in ways that maximize the ratio of desired to undesired signals.

25 Claims, 3 Drawing Sheets

MODULATION METHODS AND STRUCTURES FOR WIRELESS COMMUNICATION SYSTEMS AND TRANSCEIVERS

CROSS REFERENCES TO RELATED APPLICATIONS

This application claims the benefit of U.S. Provisional Application Serial No. 60/214,894 filed Jun 29, 2000.

BACKGROUND OF THE INVENTION

Wireless communication systems have typically selected like transmission processes for both upstream and downstream carrier signals. In these systems, therefore, a single selection is chosen as a trade-off between cost and effectiveness and such trade-offs have not generally realized optimum utilizations of existing communication technologies.

SUMMARY OF THE INVENTION

The present invention is directed to wireless communication methods and structures that enhance communication robustness while reducing cost. These goals are realized by communicating downstream data with orthogonal frequency division multiplexing (OFDM) transmission processes and upstream data with single carrier transmission processes.

This combination of transmission processes is configured with various signal modulations (e.g., quadrature phase shift keying (QPSK), m-ary phase shift keying (MPSK) and n-quadrature amplitude modulation (QAM)) to provide lower cost upstream communication from customer services equipments (CPEs) and more robust downstream communication from headends than has been achieved in conventional communication systems.

In system embodiments, signal diversity is enhanced by receiving communication signals with multiple antennas that are spatially separated and potentially have different polarizations to thereby enhance signal diversity. Signal diversity is further enhanced by combining the received signals in ways that maximize the ratio of desired to undesired signals.

The novel features of the invention are set forth with particularity in the appended claims. The invention will be best understood from the following description when read in conjunction with the accompanying drawings

DETAILED DESCRIPTION OF THE INVENTION

The present invention is directed to wireless communication methods and systems that combine OFDM transmission processes for downstream data communication and single carrier frequency hopping transmission processes for upstream data communication. OFDM is relatively expensive to realize but is particularly effective for non-line-of-sight communication applications because of its relative impunity to multipath phase and amplitude effects and its ability to realize cost effective methods for correcting these effects at the receiver. Although single carrier frequency hopping is more cost effective, it has often been limited to line-of-sight applications. The present invention employs these processes in embodiments that reduce costs and enhance communication robustness. A detailed investigation of these communication methods is preceded by the following description of a system embodiment.

Figure 1:
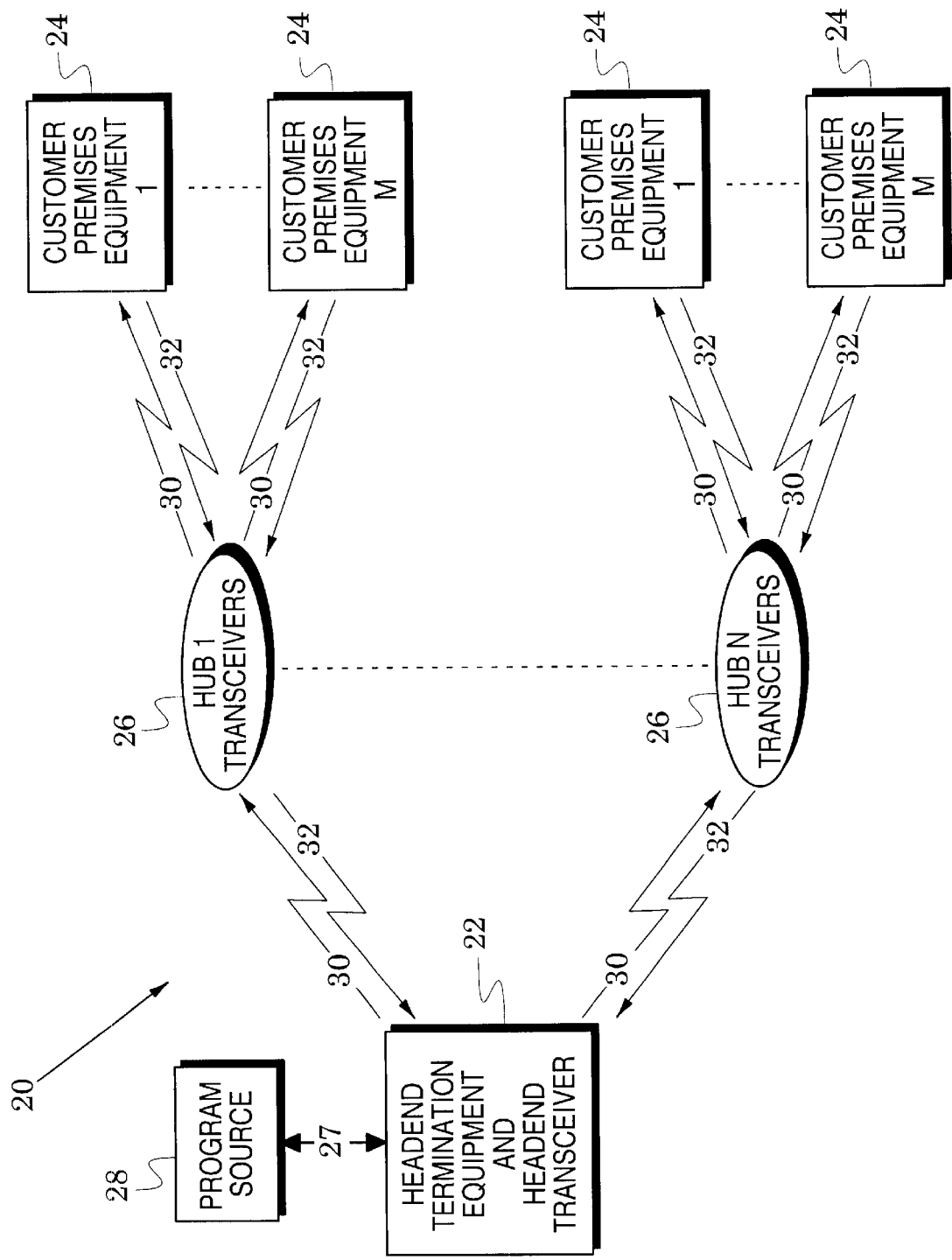
FIG. 1 is a block diagram of a wireless communication system of the present invention.

A communication system 20 is shown in FIG. 1. It includes a headend 22 and a plurality (e.g., M) of customer premises equipments 24 that are associated with each of a plurality (e.g., N) hub transceivers 26 that relay communication signals between the headend and the CPEs. The headend 22 receives program data 27 from program sources 28 (e.g., internet data via Ethernet protocol and television data via satellite and cable).

With its termination equipment and transceivers, the headend modulates the program data onto OFDM downstream carrier signals 30 which are generally relayed via the hub transceivers 26 to the CPEs 24. The CPEs generate CPE data and modulate it onto upstream single carrier signals 32 which are relayed via the hub transceivers 26 to the headend 22.

Figure 2:
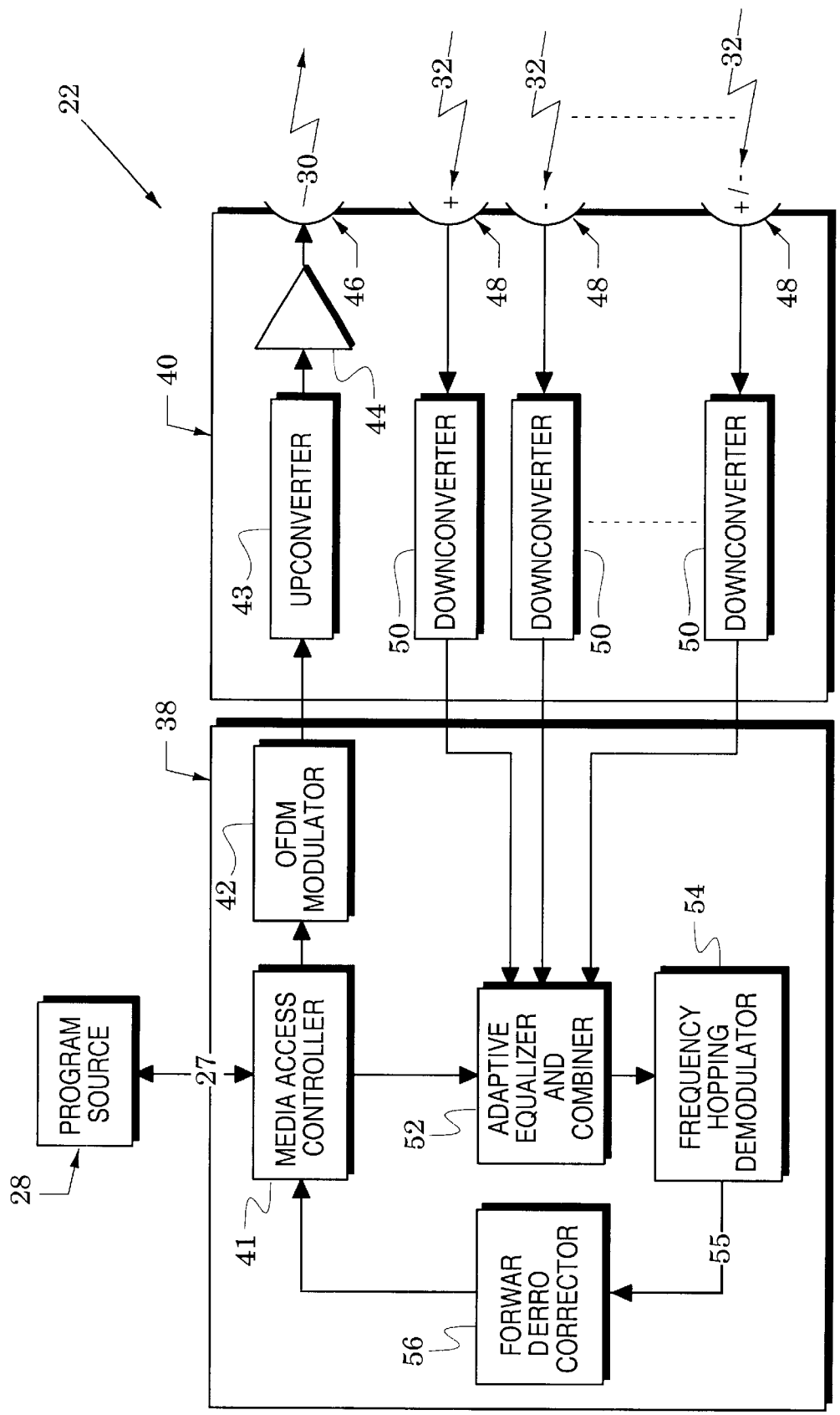
FIG. 2 is a block diagram of a headend in the communication system of FIG. 1.

The headend 22 is illustrated in FIG. 2 which shows that it includes conventional termination equipment 38 and a headend transceiver 40 that receives the program data 27 into a media access controller 41 whose output is processed through an OFDM modulator 42, a downstream upconverter 43 and a power amplifier 44. The program data is thus modulated onto OFDM downstream carrier signals 30 which are radiated from an antenna 46.

Figure 3:
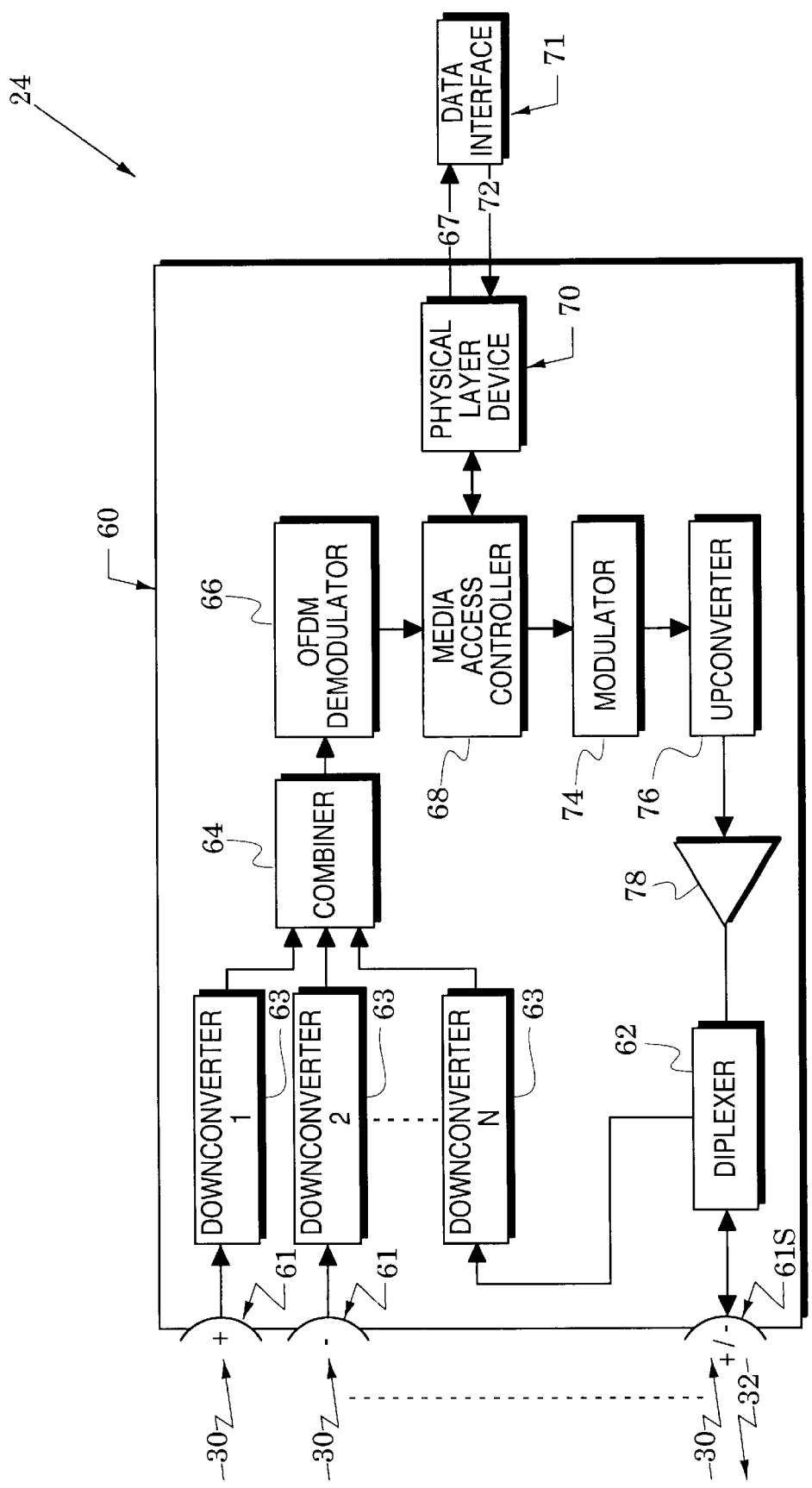
FIG. 3 is a block diagram of a CPE in the communication system of FIG. 1.

The headend also includes a plurality of receive antennas 48 that are spatially separated and which are configured to receive upstream single carrier signals 32 with different polarizations (e.g., vertical and horizontal polarizations) as indicated by + and − polarization symbols. The output of these receive antennas is downconverted in upstream downconverters 50 and coupled through an adaptive equalizer and combiner 52 to a demodulator 54 which passes upstream data 55 through a forward error corrector 56 to the media access controller 40. As shown in FIG. 3, an exemplary CPE 24 includes a CPE transceiver 60. The downstream carrier signals 30 are received within this transceiver by a plurality of receive antennas 61 which are spatially separated and configured to receive different signal polarizations as indicated by + and − polarization symbols. A selected receive antenna 61S is preferably shared with upstream signals by steering its respective downstream signal through a diplexer 62 (as an example, the shared antenna 61S is configured with two polarizations).

Signals from the antennas are downconverted in downstream downconverters 63 and combined in a diversity combiner 64 before being demodulated in an OFDM demodulator 66. The demodulated downstream data signals 67 are processed through a media access controller 68 and a physical layer device (PHY) 70 to a CPE data interface 71 (e.g., a personal or network computer).

Upstream data signals 72 are originated by CPE users and are processed through the physical layer device 70 and the media access controller 68 to a modulator 74 where they are modulated onto an upstream single carrier signal that is upconverted in an upstream upconverter 76 and amplified in a power amplifier 78. The single carrier signal 32 is steered through the diplexer 62 to be radiated from the shared antenna 60S.

Having described the basic structures of the communication system 20 of FIGS. 1–3, attention is now directed to operation of the system. In downstream data communication, the media access controller 41 of FIG. 2 oversees and controls various communication functions, e.g., demodulation, modulation, frequency and bandwidth selection, power ranging, program source allocation and signal combinations in the CPE diversity combiner 64 of FIG. 3. In addition, bundling of program data 27 at the headend 22 by the media access controller 41 presents data in a form that is usable by the CPE media access controller 68 of FIG. 3.

Output signals from the media access controller 41 of FIG. 2 are processed in the OFDM modulator 42 with inverse Fourier transforms and error correction coding. The OFDM modulator provides various communication functions which include generating a variable number of subcarriers, sending continual scattered pilot signals that contain training sequences for channel estimation, providing variable guard bands and selecting various modulations (e.g., QPSK, MPSK and QAM) in each subcarrier.

Intermediate frequency data from the OFDM modulator is then upconverted (e.g., to the 2500 megahertz range) in the downstream upconverter 43 and amplified by the power amplifier 44 which is preferably backed off its maximum amplifying capability by a significant amount to enhance its linearity The upconverted and amplified downstream carrier signals 30 are then broadcast via the antenna 46.

After relaying by hub transceivers (26 in FIG. 1), the downstream carrier signals are received, at each CPE 24 with the receive antennas 61 of FIG. 3 that are spatially separated and have different polarizations. The spatial differences provide reception time differences and, thereby, phase differences in the received downstream signals. These factors (i.e., polarization and phase) are the dominant elements in achieving decorrelation in received signals that enhances signal quality of the final received signal.

The downstream carrier signals are then downconverted in FIG. 3 by each antenna's respective downconverter 62 and combined in the diversity combiner 64 which scales (amplifies or attenuates), delays, and adds the downconverted signals in a way that maximizes the ratio of desired to undesired signals for the signal to be demodulated and thus minimizes the error rate. The demodulated signal will be passed to the media access controller 68 by the OFDM demodulator 66. The diversity combiner 64 also processes continual and scattered pilot signals that contain training sequences for channel estimation.

The OFDM demodulator 66 processes the downconverted signals with fast Fourier transforms and forward error correction. Conventional OFDM modulators are capable of demodulating a variable number of subcarriers, working with variable channel guard bands and providing the necessary demodulation (e.g., QPSK, MPSK or QAM) in each subcarrier. Finally, the downstream data is channel processed in the media access controller 68 and output to an appropriate PHY 70 which further transforms the downstream data 67 into a format and voltage level that is usable by the CPE data interface 71. The OFDM transmission processes in the downstream communication of FIGS. 1–3 essentially divide a given channel (e.g., a 6 megahertz channel) into a large number (e.g., 200 to 8000) of subchannels. Each subchannel contains a fraction of the original channel information and is isolated by temporal guard bands (e.g., several kilohertz or $\frac{1}{32}$ to $\frac{1}{4}$ of the data symbol rate) from subsequent symbols to thereby decrease multipath effects on the downstream communication.

Attention is now directed to the upstream data communication of the communication system 20 of FIGS. 1–3 which begins with user-generated CPE data 72 at a CPE data interface 71 of each CPE 24.

This CPE data is directed through the PHY 70 to the media access controller 68 which bundles the data in a form that is usable by the head-end transceiver (22 in FIG. 2). In addition, the media access controller 68 performs other upstream data communication functions, e.g., overseeing and controlling demodulation, modulation, frequency and bandwidth selection, and power ranging.

The CPE data is then modulated (e.g., with QPSK or QAM) by the modulator 74 which preferably operates in a frequency hopping single carrier transmission mode. In particular, the frequency is hopped between channels under control of the media access controller 68 to reduce dispersive effects of the weather and terrain (e.g., rain and foliage).

After the data is modulated, the intermediate frequency signals are upconverted (e.g., to the 2500 megahertz range) in the upstream upconverter 76 and amplified in the power amplifier 78. Because single frequency modulation is used for upstream communication, this power amplifier need not be as linear (and therefore not as expensive) as is preferred for the OFDM of the downstream communications. Finally, the diplexer 62 couples the power amplifier 78 to the shared antenna 61S so that the upstream single carrier signal 32 is broadcast to the head end transceiver (22 in FIG. 2) via a respective hub transceiver (26 in FIG. 1).

In the headend transceiver 22 of FIG. 2, the upstream single carrier signals 32 are received in the receive antennas 48 that are spatially separated and configured to receive signals having different polarizations. The upstream single carrier signals are then combined in the adaptive equalizer and combiner 52 which varies the order of equalizing and combining to that which is the most effective for error reduction and which will scale (amplify or attenuate), delay, and/or add the downconverted signals to maximize the ratio of desired to undesired signals.

In particular, the adaptive equalization methods of the adaptive equalizer and combiner 52 are directed by the media access controller 41 to minimize the probability of data errors by the use of different algorithms (e.g., decision-directed equalization, filter output computation based upon training and transversal filter storage, transversal filter coefficient adaptation, zero-forcing equalization which starts with the sinc function ($\sin \pi t / \pi t$) and solves n simultaneous equations, least mean squares in which transversal filters are gradually adjusted to converge to a filter that minimizes the error between the equalized data word and a stored reference header word, decision feedback equalization and recursive least squares). To facilitate this algorithm processing, the adaptive equalizer is preferably programmed in a digital signal processor or similar flexible state machine architecture that is optimized for implementing algorithms.

After equalization, the signal is demodulated (e.g., with QPSK or QAM demodulation) to baseband by the single carrier demodulator 54. If frequency hopped, the frequency selection for the frequency hopped carrier signal 32 is controlled by the media access controller 41 to minimize dispersive effects of the weather and terrain (e.g., rain and foliage).

The CPE data is then processed with various algorithms (e.g., Viterbi and Reed-Solomon) in the forward error corrector 56 to further reduce errors and is then coupled to the media access controller 41 for realizing various customer needs.

In operation of the communication system 20 of FIGS. 1–3, therefore, the downstream data is communicated with the aid of OFDM transmission processes and the upstream data is communicated with the aid of single carrier transmission processes. The present invention thus utilizes the better non line-of-sight capabilities of OFDM processes for headend and hub transmissions where relatively few equipment installations are required and single carrier transmission processes for the far more numerous CPE installations.

The system thus limits the number of expensive installations because it has only one headend (22 in FIG. 1) and its hub transceivers (26 in FIG. 1) are also of limited quantity. In an exemplary cost reduction, the expensive linear power amplifiers (44 in FIG. 2) that are required for OFDM processes are used only in the headend and the hubs. The receiver portion of the headend transceiver can also be configured to be more sensitive (and thus more expensive) because it is only used once in the communication system 20.

The single carrier for upstream communication is preferably frequency hopped for each transmission burst and received at the headend with multiple antennae that differ spatially and have different polarizations to thereby compensate, for the conventional lack of robustness of this method. The degrading effects of various link characteristics (e.g., multipath and frequency fading) are thereby mitigated.

These link characteristics determine how well a particular communication signal is received. In a method of the invention, the CPE transceiver (60 in FIG. 3) communicates to the headend (e.g., via acknowledgement handshaking protocols) which of a set of substantially separated frequency channels will receive the downstream data of various bandwidth requirements.

The CPE transceiver also communicates which of a set of substantially separated frequency hopping channels it will use to transmit the upstream data (which may also have various bandwidth requirements) to thereby achieve frequency diversity by means of frequency hopping across a substantially separated set of available frequency channels. Thus frequency diversity is realized downstream with channel selection across a set of substantially separated frequency channels and is realized upstream by frequency hopping across a substantially separated set of available channels.

In a sectorized or cellular embodiment of the invention, the available frequency is divided such that the downstream and upstream channels assigned to each CPE are interleaved with those assigned to CPEs in other sectors or cells. In this system embodiment, some communication channels are not available to the CPEs of a particular sector or cell.

In a method of the invention, therefore, initial communication contact begins with a predetermined order of available channels, so that communication links can be established for initial contact between the headend and the CPEs. The order and sequencing is preferably part of a look-up table that is programmed into signal computers of the headend and CPE media access controllers (41 in FIG. 2 and 68 in FIG. 3).

Communication components that have been described above (e.g., media access controllers, diversity combiners and physical layer devices) are conventional and easily obtained in varying degrees of complexity. Modulation methods of the invention have been disclosed above to include n-quadrature amplitude modulation. Exemplary values for n are 4, 16, 32, 64, 128, 256, 512 and 1024.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of communicating downstream data from a communication headend to a plurality of customer premises equipments (CPEs) and upstream data from said CPEs to said headend, comprising the steps of:
   conveying said downstream data from said headend to each of said CPEs on a plurality of orthogonal frequency division multiplexed (OFDM) downstream carrier signals; and
   sending said upstream data from each of said CPEs to said headend on a respective upstream single carrier signal.

2. The method of claim 1, wherein said conveying step includes the steps of:
   transmitting said OFDM downstream carrier signals from said headend; and
   receiving said OFDM downstream carrier signals at each of said CPEs with at least two antennas which are spatially separated and have a plurality of polarizations to thereby enhance communication diversity.

3. The method of claim 2, wherein said transmitting step includes the step of modulating said downstream data onto said OFDM downstream carrier signals with at least one of quadrature phase shift keying, m-ary phase shift keying and n-quadrature amplitude modulation.

4. The method of claim 3, wherein said modulating step includes the step of processing said downstream data with inverse Fourier transforms and error correction codes.

5. The method of claim 2, wherein said receiving step includes the step of diversely combining said OFDM downstream carrier signals after reception from said antennas.

6. The method of claim 2, wherein said receiving step includes the step of processing said downstream data with fast Fourier transforms and forward error correction.

7. The method of claim 1, wherein said sending step includes the step of frequencing hopping said upstream single carrier signal.

8. The method of claim 1, wherein said sending step includes the steps of:
   transmitting a respective upstream single carrier signal from each of said CPEs; and
   receiving said upstream single carrier signal at said headend with at least two antennas which are spatially separated and have a plurality of polarizations to thereby enhance communication diversity.

9. The method of claim 8, wherein said transmitting step includes the step of modulating said upstream data onto said upstream single carrier signal with at least one of quadrature phase shift keying and n-quadrature amplitude modulation.

10. The method of claim 8, wherein said receiving step includes the step of diversely combining said OFDM upstream carrier signals after reception from said antennas.

11. The method of claim 8, wherein said receiving step includes the step of processing said upstream data with adaptive channel equalization and forward error correction.

12. The method of claim 11, wherein said equalization includes spatial and temporal equalization.

13. The method of claim 1, further including the step of frequency interleaving OFDM downstream carrier signals and an upstream single carrier signal corresponding to any one of said CPEs with OFDM downstream carrier signals and an upstream single carrier signal corresponding to others of said CPEs.

14. The method of claim 13, wherein said interleaving step includes the step of assigning predetermined signal frequencies for each of said CPEs to thereby establish initial communication with said headend.

15. A communication system for communicating downstream data from a communication headend to a plurality of customer premises equipments (CPEs) and upstream data from said CPEs to said headend, the system comprising:
- a headend that conveys said downstream data to each of said CPEs on a plurality of orthogonal frequency division multiplexed (OFDM) downstream carrier signals; and
- a plurality of CPEs that each sends said upstream data to said headend on a respective upstream single carrier signal.

16. The system of claim 15, wherein said headend includes an OFDM modulator that modulates said downstream data onto said OFDM downstream carrier signals with at least one of quadrature phase shift keying, m-ary phase shift keying and n-quadrature amplitude modulation.

17. The system of claim 16, wherein said OFDM modulator is configured to process said downstream data with inverse Fourier transforms and error correction codes.

18. The system of claim 15, wherein each of said CPEs includes at least two antennas which are spatially separated and have a plurality of polarizations to thereby receive said OFDM downstream carrier signals with enhanced diversity.

19. The system of claim 18, wherein each of said CPEs includes:
- at least one downconverter that downconverts said OFDM downstream carrier signals to downconverted OFDM downstream carrier signals;
- a diversity combiner that enhances the received signal strength of said downconverted OFDM downstream carrier signals; and
- an OFDM demodulator that processes said downconverted OFDM downstream carrier signals with fast Fourier transforms and forward error correction.

20. The system of claim 15, wherein each of said CPEs includes a modulator that modulates said upstream data onto its respective upstream single carrier signal with at least one of quadrature phase shift keying and n-quadrature amplitude modulation.

21. The system of claim 15, wherein said headend and each of said CPEs include respective media access controllers that facilitate frequency hopping of said respective upstream single carrier signal.

22. The system of claim 15, wherein said headend includes at least two antennas which are spatially separated and have a plurality of polarizations to thereby receive said upstream single carrier signal with enhanced diversity.

23. The system of claim 20, wherein said headend includes:
- at least one downconverter that downconverts said upstream single carrier signal to a downconverted upstream single carrier signal;
- a diversity combiner that enhances the received signal strength of said downconverted upstream single carrier signal; and
- a demodulator that demodulates said downconverted upstream single carrier signal.

24. The system of claim 15, wherein said headend and said CPEs are configured to frequency interleave OFDM downstream carrier signals and an upstream single carrier signal corresponding to any one of said CPEs with OFDM downstream carrier signals and an upstream single carrier signal corresponding to others of said CPEs.

25. The system of claim 24, wherein said headend and said CPEs are further configured to assign predetermined signal frequencies for each of said CPEs to thereby establish initial communication with said headend.

* * * * *